(12) United States Patent
Mitterleitner et al.

(10) Patent No.: US 11,940,304 B2
(45) Date of Patent: Mar. 26, 2024

(54) POSITION-MEASURING DEVICE HAVING FOUR SCANNING UNITS AND TWO MEASURING GRADUATIONS

(71) Applicant: DR. JOHANNES HEIDENHAIN GmbH, Traunreut (DE)

(72) Inventors: Josef Mitterleitner, Chieming (DE); Thomas Becker, Traunreut (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 43 days.

(21) Appl. No.: 17/405,065

(22) Filed: Aug. 18, 2021

(65) Prior Publication Data

US 2022/0065668 A1 Mar. 3, 2022

(30) Foreign Application Priority Data

Aug. 27, 2020 (EP) .................................... 20192999

(51) Int. Cl.
*G01D 5/244* (2006.01)
*G01D 5/347* (2006.01)

(52) U.S. Cl.
CPC ...... *G01D 5/24438* (2013.01); *G01D 5/34707* (2013.01); *G01D 5/34715* (2013.01); *G01D 5/34746* (2013.01); *G01D 5/3473* (2013.01)

(58) Field of Classification Search
CPC ............ G01D 5/3473; G01D 5/24438; G01D 5/34707; G01D 2205/90; G01D 5/34715; G01D 5/34746; G01B 5/0004; G01B 3/004; G01B 5/004; G01B 7/003; G01B 11/002
See application file for complete search history.

(56) References Cited

U.S. PATENT DOCUMENTS

| 7,608,813 B1 | 10/2009 | Milvich et al. |
| 9,970,788 B2 | 5/2018 | Taniguchi et al. |
| 2014/0049252 A1* | 2/2014 | Taniguchi ............ G01D 5/2455 324/207.21 |

(Continued)

FOREIGN PATENT DOCUMENTS

| DE | 4306634 A1 * | 9/1993 | ............ G01B 5/163 |
| DE | 4306634 A1 | 9/1993 | |

(Continued)

*Primary Examiner* — Jennifer D Bennett
(74) *Attorney, Agent, or Firm* — LEYDIG VOIT & MAYER LTD.

(57) ABSTRACT

A position-measuring device includes a scale having first and second measuring graduations, which each include graduation structures that respectively extend parallel to first and second directions. A first scanning unit is associated with the first measuring graduation, and second and third scanning units are associated with the second measuring graduation. A fourth scanning unit is associated with the first or second measuring graduation. In the former case, a first straight connecting line running through scanning locations of the first and fourth scanning units and a second straight connecting line running through scanning locations of the second and third scanning units are parallel or form a predetermined angle therebetween that is not equal to a sum of the angles of the first and second directions. In the latter case, the scanning locations of the second, third and fourth scanning units do not lie on a common straight connecting line.

17 Claims, 4 Drawing Sheets

(56) References Cited

U.S. PATENT DOCUMENTS

2014/0103914 A1* 4/2014 Kusumi .................. G01B 7/14
  324/207.21
2016/0231143 A1 8/2016 McAdam

FOREIGN PATENT DOCUMENTS

DE 102013013718 A1 2/2014
EP 2187179 A1 5/2010
WO 2009103743 A1 8/2009

* cited by examiner

POSITION-MEASURING DEVICE HAVING FOUR SCANNING UNITS AND TWO MEASURING GRADUATIONS

CROSS REFERENCE TO RELATED APPLICATIONS

This application claims benefit to European Patent Application No. EP 20192999.9, filed on Aug. 27, 2020, which is hereby incorporated by reference herein.

FIELD

The present invention relates to a position-measuring device.

BACKGROUND

WO 2009/103743 A1 discloses an X-Y table having a measurement system for position determination, the measurement system including a stationary reference part and an intermediate part that is supported so as to be displaceable relative to the reference part in a first direction, an object that is supported so as to be displaceable relative to the intermediate part in a second direction, a part to be processed being disposed on the object or on the reference part, and further including at least one 1Dplus encoder for the first direction for measuring in-plane degrees of freedom between the reference part and the intermediate part, and at least one 1Dplus encoder for the second direction for measuring in-plane degrees of freedom between the object and the intermediate part, so that the position of a tool center point (TCP) on the object or part can be determined. The 1Dplus encoders are structurally arranged such that their projection into the plane defined by the first and second directions and containing the tool center point (TCP) is outside the part throughout the travel range of the X-Y table. This makes it possible to satisfy the Abbe condition, and thus to accurately determine the tool center point (TCP) on the object using simple 1Dplus encoders.

A 1Dplus encoder known from WO 2009/103743 A1 (FIG. 1) includes three scanning locations (scanning points) to measure the degrees of freedom X, Y, RZ. The 1Dplus encoder has a scale and a scanning unit carrier disposed so as to be movable relative to the scale. The scanning unit carrier includes three scanning heads (scanning units) to implement the three scanning locations. Position values in the degrees of freedom X, Y, RZ can be determined from measurement values obtained at the individual scanning locations using suitable transformation equations.

The 1Dplus encoder described in WO 2009/103743 A1 has the disadvantage of being sensitive to thermal expansions of the scale and/or of the scanning unit carrier. This is due to the fact that it is not possible to implement a thermally neutral point in this 1Dplus encoder. Thus, due to a coefficient of linear expansion of the scanning unit carrier, relative movements occur between the individual scanning locations, in particular also under uniform temperature changes. These relative movements lead to changes in the position outputs at the individual scanning locations, and thus, subsequent to the application of the respective transformation equations, in undesired positional deviations in the degrees of freedom X, Y, RZ. Similarly, thermal expansions of the scale cause changes in the position outputs at the individual scanning locations, which in turn lead to undesired positional deviations in the degrees of freedom X, Y, RZ.

SUMMARY

In an embodiment, the present disclosure provides a position-measuring device comprising a scale having a first measuring graduation and a second measuring graduation. The first measuring graduation includes a series of graduation structures which each extend parallel to a first direction, and the second measuring graduation includes a series of graduation structures which each extend parallel to a second direction. The first and second directions extend at a respective angle different from 0° with respect to a longitudinal axis of the scale. A first scanning unit is associated with the first measuring graduation for scanning the first measuring graduation. A second scanning unit is associated with the second measuring graduation for scanning the second measuring graduation. A third scanning unit is associated with the second measuring graduation for scanning the second measuring graduation. A fourth scanning unit is associated with the first or second measuring graduation for scanning the first or second measuring graduation, respectively. In a case that the fourth scanning unit is associated with the first measuring graduation for scanning the first measuring graduation, a first straight connecting line running through scanning locations of the first and fourth scanning units and a second straight connecting line running through scanning locations of the second and third scanning units are parallel or form a predetermined angle therebetween, wherein the predetermined angle is not equal to a sum of the angle of the first direction and the angle of the second direction. In a case that the fourth scanning unit is associated with the second measuring graduation for scanning the second measuring graduation, the scanning locations of the second, third and fourth scanning units do not lie on a common straight connecting line.

BRIEF DESCRIPTION OF THE DRAWINGS

Subject matter of the present disclosure will be described in even greater detail below based on the exemplary figures. All features described and/or illustrated herein can be used alone or combined in different combinations. In the figures, like or functionally like elements are denoted by like reference numerals. The features and advantages of various embodiments will become apparent by reading the following detailed description with reference to the attached drawings, which illustrate the following.

DETAILED DESCRIPTION

Figure 1:
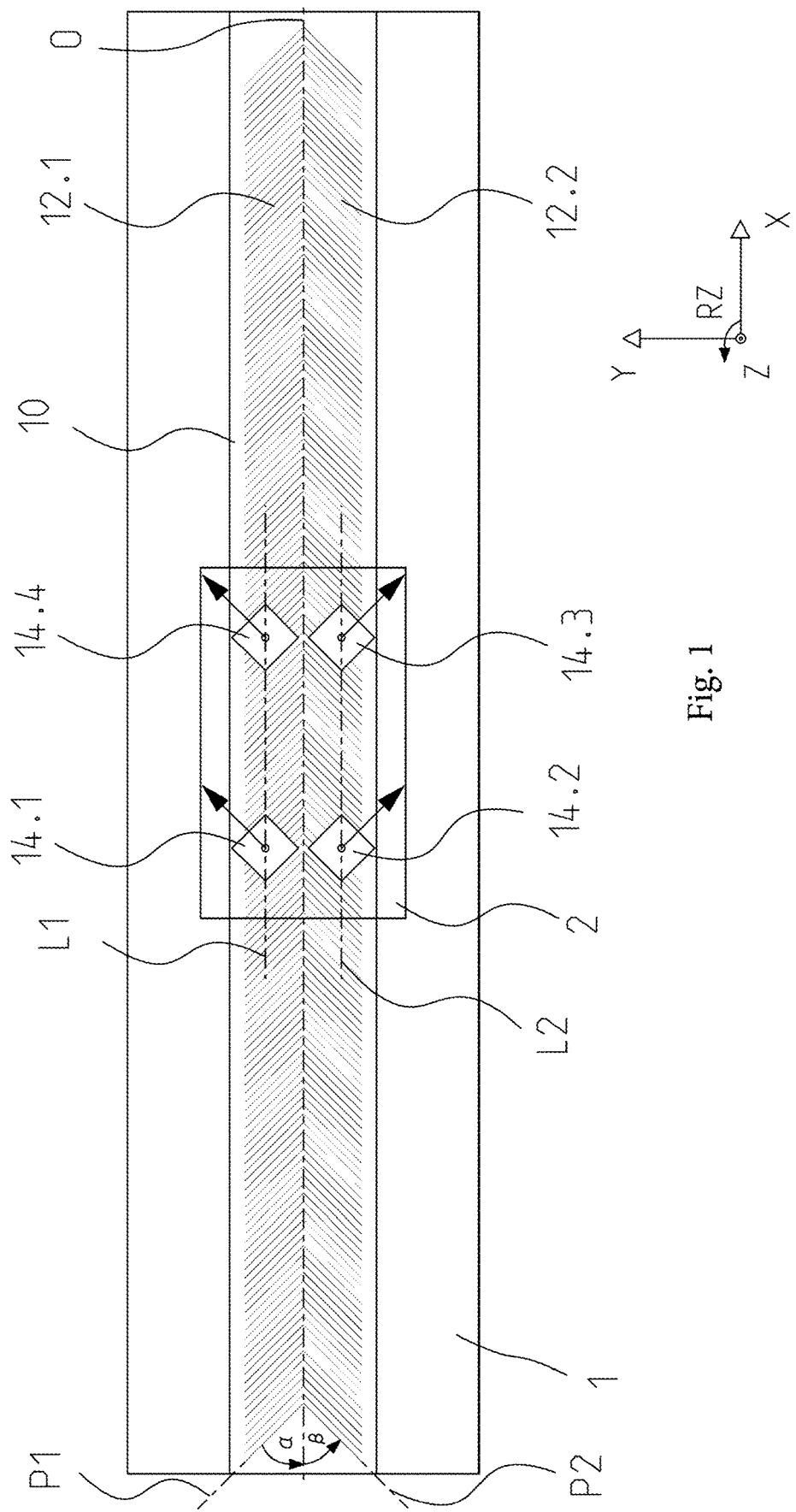
FIG. 1 shows a position-measuring device in accordance with a first exemplary embodiment.

Embodiments of the present invention provide a position-measuring device that permits accurate position measurement in a main measurement direction and in two other degrees of freedom.

The position-measuring device designed in accordance with an embodiment of the invention includes a scale having a first measuring graduation and a second measuring graduation, a first scanning unit associated with the first measuring graduation for scanning the first measuring graduation, a second scanning unit associated with the second measuring graduation for scanning the second measuring graduation, and a third scanning unit associated with the second measuring graduation for scanning the second measuring graduation. The first measuring graduation includes a series of graduation structures which each extend parallel to a first direction. The second measuring graduation includes a series of graduation structures which each extend parallel to a second direction. The first and second directions extend at a respective angle different from 0° with respect to a longitudinal axis of the scale. The position-measuring device has a fourth scanning unit associated with the first or second measuring graduation for scanning the first or second measuring graduation, respectively. If the fourth scanning unit is associated with the first measuring graduation for scanning the first measuring graduation, then a first straight connecting line running through the scanning locations of the first and fourth scanning units and a second straight connecting line running through the scanning locations of the second and third scanning units are parallel or form a predetermined angle therebetween. The predetermined angle is not equal to a sum of the angle of the first direction and the angle of the second direction. If the fourth scanning unit is associated with the second measuring graduation for scanning the second measuring graduation, then the scanning locations of the second through fourth scanning units do not lie on a common straight connecting line.

It is advantageous if the position-measuring device has a scanning unit carrier disposed so as to be movable relative to the scale and intended for carrying the first through fourth scanning units.

It is also advantageous if the first and second measuring graduations and the first through fourth scanning units are arranged and adapted such that a position of the scanning unit carrier relative to the scale can be determined in a first measurement direction (main measurement direction) and in two other degrees of freedom.

The position-measuring device is preferably used for position measurement in in-plane degrees of freedom (i.e., degrees of freedom X, Y, RZ).

Preferably, the graduation structures of the first measuring graduation and the graduation structures of the second measuring graduation are respectively arranged periodically along a first measurement direction (main measurement direction).

The first measuring graduation and the second measuring graduation are in particular incremental graduations.

The graduation structures of the first measuring graduation and the graduation structures of the second measuring graduation each include, in particular, graduation lines. The graduation lines may have identical widths and be continuous along their extent. Alternatively, the graduation lines may be interrupted or width-modulated along their extent.

Instead of incremental graduations, the first and second measuring graduations may each also be absolute graduations, for example, in the form of a pseudo-random code.

By means of an embodiment of the invention, thermally invariant position measurement is achieved in the degrees of freedom X, Y, RZ using an additional (fourth) scanning location. To this end, the graduation structures of the first measuring graduation and the graduation structures of the second measuring graduation are each inclined relative to the main measurement direction. This has the advantage that in case of relative movement between the scale and the scanning unit carrier in the main measurement direction, changes in position will always occur at all four scanning locations. This makes it possible, on the one hand, to implement signal compensation for all scanning locations (i.e., the scanning locations of the first through fourth scanning units) in order to increase accuracy. On the other hand, this also makes it possible to provide and detect reference marks for both measuring graduations (i.e., the first and second measuring graduations) even when there is no transverse movement; i.e., relative movement in a further (second) measurement direction transverse to the main measurement direction. Thus, an absolute reference can be established for all three in-plane degrees of freedom.

Thus, embodiments of the invention make it possible to implement thermally invariant position measurement in the degrees of freedom X, Y, RZ and, at the same, enable signal compensation and the provision of reference marks for both measuring graduations in order to establish an absolute reference.

Other details and advantages of embodiments of the present invention will become apparent from the following description of exemplary embodiments of the invention, taken in conjunction with the figures.

First through third exemplary embodiments will now be described with reference to FIGS. 1, 2 and 4. A counterexample (negative example) will be described with reference to FIG. 3. The position-measuring device according to the first through third exemplary embodiments serves to measure the relative position of two relatively movable objects in a first measurement direction X and in two other degrees of freedom Y, RZ. Degree of freedom X is a linear degree of freedom and corresponds to first measurement direction X. Degree of freedom Y is a linear degree of freedom and corresponds to a second measurement direction Y perpendicular to first measurement direction X. Degree of freedom RZ is a rotational degree of freedom about linear axis Z. First measurement direction X is the main measurement direction, and the other two degrees of freedom Y, RZ are deviations at the respective position X, which can be measured by the position-measuring device according to the first through third exemplary embodiments.

The position measuring device according to the first exemplary embodiment includes a scale 10, which is disposed on a base 1 (e.g., stationary reference part). Furthermore, the position measuring device according to the first exemplary embodiment includes a scanning unit carrier 2 disposed so as to be movable relative to scale 10 and intended for carrying first through fourth scanning units 14.1 through 14.4. First through fourth scanning units 14.1 through 14.4 are disposed on a bottom side of scanning unit carrier 2. Scanning unit carrier 2 is movable at least in the degrees of freedom X, Y, RZ and attachable to an object to be measured.

As illustrated in FIG. 1, scale 10 includes a first measuring graduation 12.1 and a second measuring graduation 12.2. First scanning unit 14.1 is associated with first measuring graduation 12.1 and used for scanning first measuring graduation 12.1. Second scanning unit 14.2 is associated with second measuring graduation 12.2 and used for scanning second measuring graduation 12.2. Third scanning unit 14.3 is associated with second measuring graduation 12.2 and used for scanning second measuring graduation 12.2. FIG. 1 further shows that first measuring graduation 12.1 and second measuring graduation 12.2 each include a series of graduation structures. The graduation structures of first measurement graduation 12.1 each extend parallel to a first direction P1. The graduation structures of second measurement graduation 12.2 each extend parallel to a second direction P2. First and second directions P1, P2 extend at a respective angle α, β different from 0° with respect to a longitudinal axis O of scale 10.

In the position-measuring device according to the first exemplary embodiment, fourth scanning unit 14.4 is associated with first measuring graduation 12.1 and used for scanning first measuring graduation 12.1. Furthermore, in the position-measuring device according to the first exemplary embodiment, a first straight connecting line L1 running through the scanning locations of first and fourth scanning units 14.1, 14.4 and a second straight connecting line L2 running through the scanning locations of second and third scanning units 14.2, 14.3 are parallel to each other.

In the position-measuring device according to the first exemplary embodiment, angle α of first direction P1 and angle β of second direction P2 are each 45°. First straight connecting line L1 and second straight connecting line L2 are parallel to each other on the one hand, and each parallel to longitudinal axis O of scale 10 on the other hand.

Figure 2:
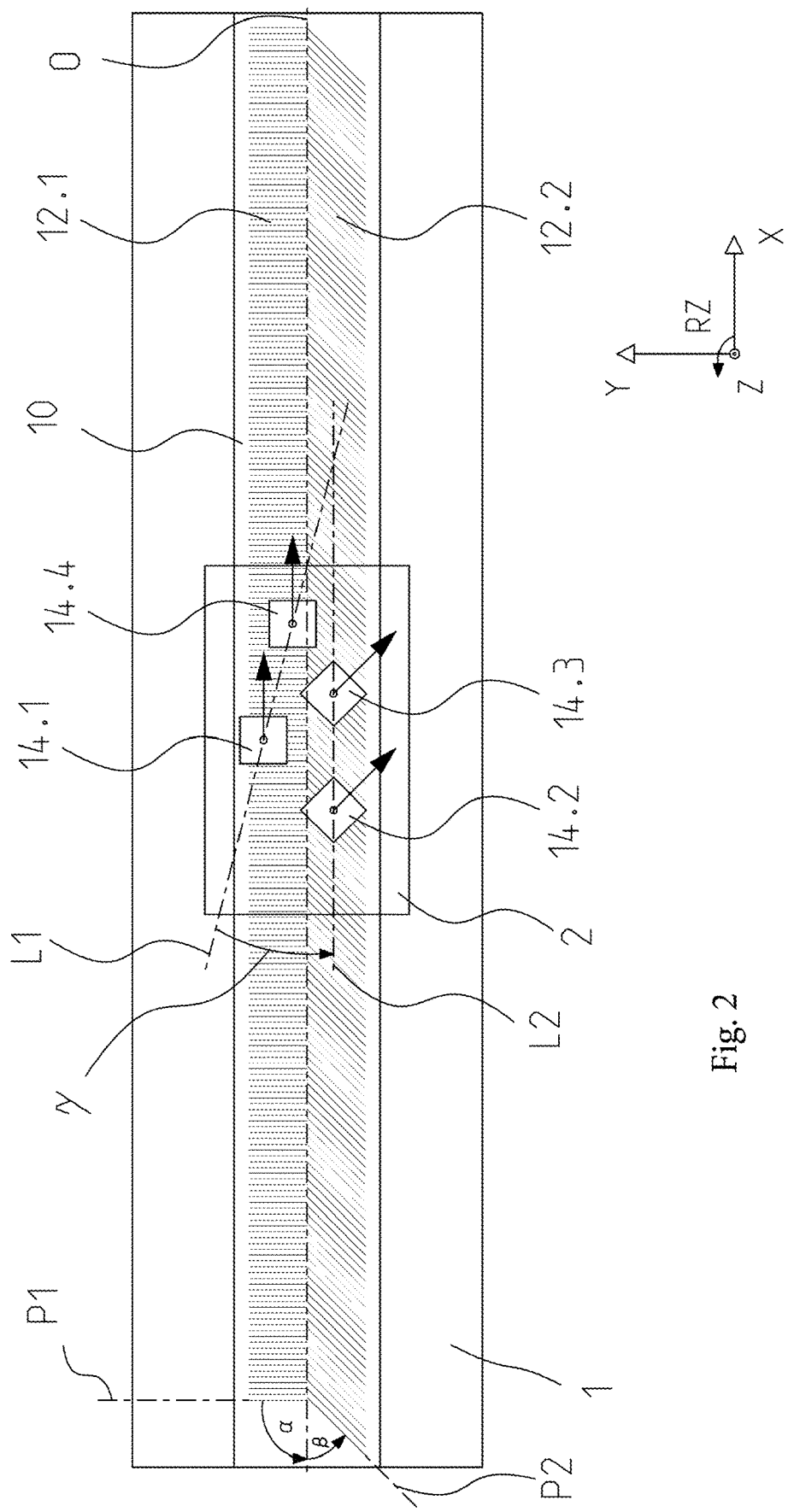
FIG. 2 shows a position-measuring device in accordance with a second exemplary embodiment.

The position-measuring device according to the second exemplary embodiment differs from the position-measuring device according to the first exemplary embodiment in that the first straight connecting line L1 running through the scanning locations of first and fourth scanning units 14.1, 14.4 and the second straight connecting line L2 running through the scanning locations of second and third scanning units 14.2, 14.3 form a predetermined angle γ therebetween (see FIG. 2). This predetermined angle γ is not equal to a sum of angle α of first direction P1 and angle β of second direction P2.

In the position-measuring device according to the second exemplary embodiment, angle α of first direction P1 is 90° and angle β of second direction P2 is 45°. The predetermined angle γ is 15°. Thus, the following condition is satisfied:

$$\gamma \neq \alpha + \beta \quad \text{(equation 1)}$$

As illustrated in FIG. 2, only the second straight connecting line L2 is parallel to longitudinal axis O of scale 10.

Figure 4:
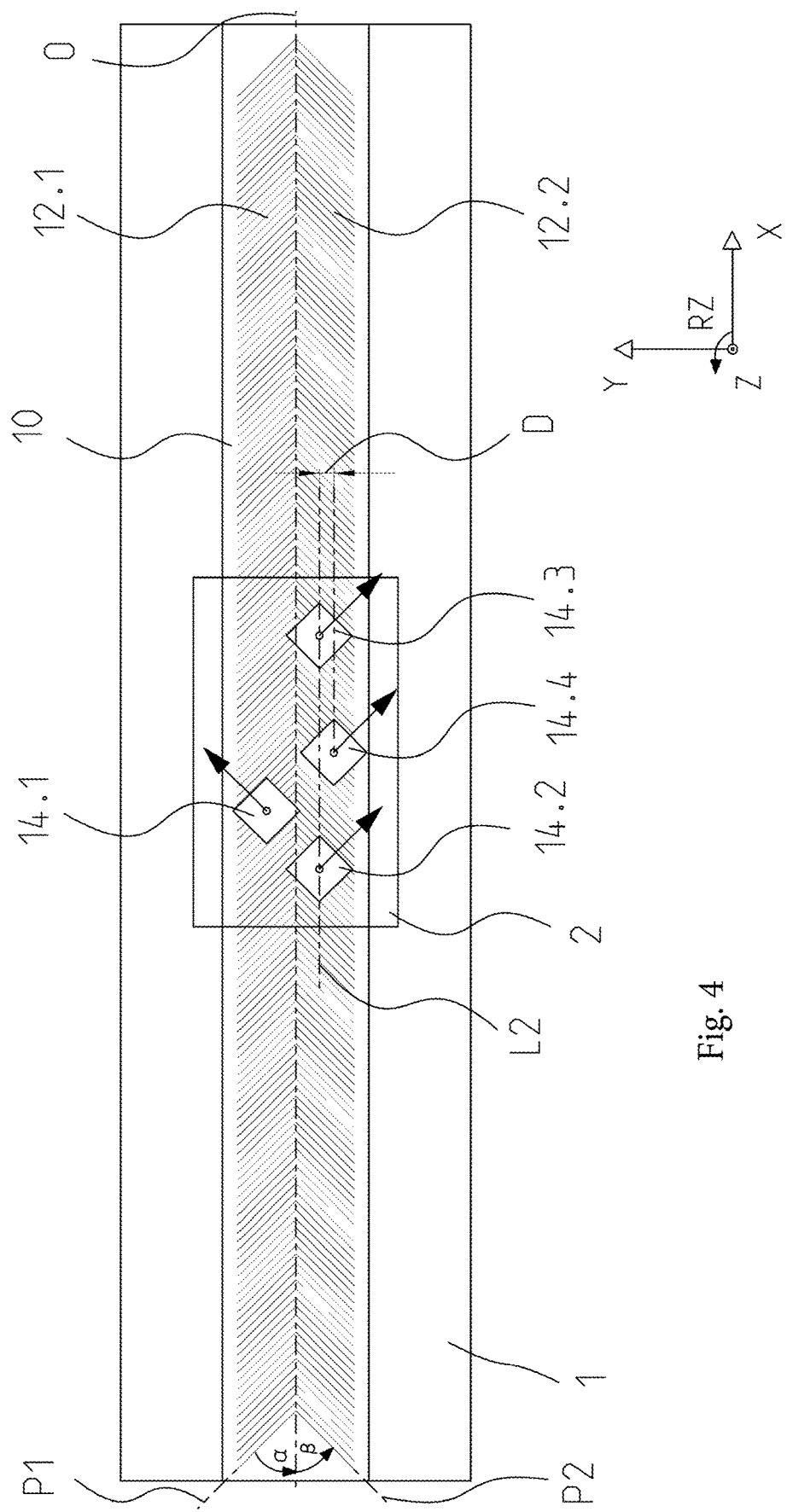
FIG. 4 shows a position-measuring device in accordance with a third exemplary embodiment.

The position-measuring device according to the third exemplary embodiment differs from the position-measuring device according to the first or second exemplary embodiment in that fourth scanning unit 14.4 is associated with second measuring graduation 12.2 and used for scanning second measuring graduation 12.2 (see FIG. 4). In particular, in the position-measuring device according to the third exemplary embodiment, the scanning locations of second through fourth scanning units 14.2 through 14.4 do not lie on a common straight connecting line.

In the position-measuring device according to the third exemplary embodiment, angle α of first direction P1 and angle β of second direction P2 are each 45°. As illustrated in FIG. 4, straight connecting line L2 (hereinafter also referred to as "second straight connecting line" analogously to the first and second exemplary embodiments) runs through the scanning locations of second and third scanning units 14.2, 14.3. This second straight connecting line L2 is parallel to longitudinal axis O of scale 10.

In the position-measuring device according to the third exemplary embodiment, a perpendicular distance D of the scanning location of fourth scanning unit 14.4 from second straight connecting line L2 is preferably greater than 2 mm. Perpendicular distance D may also be greater than 1 mm or 0.1 mm.

Figure 3:
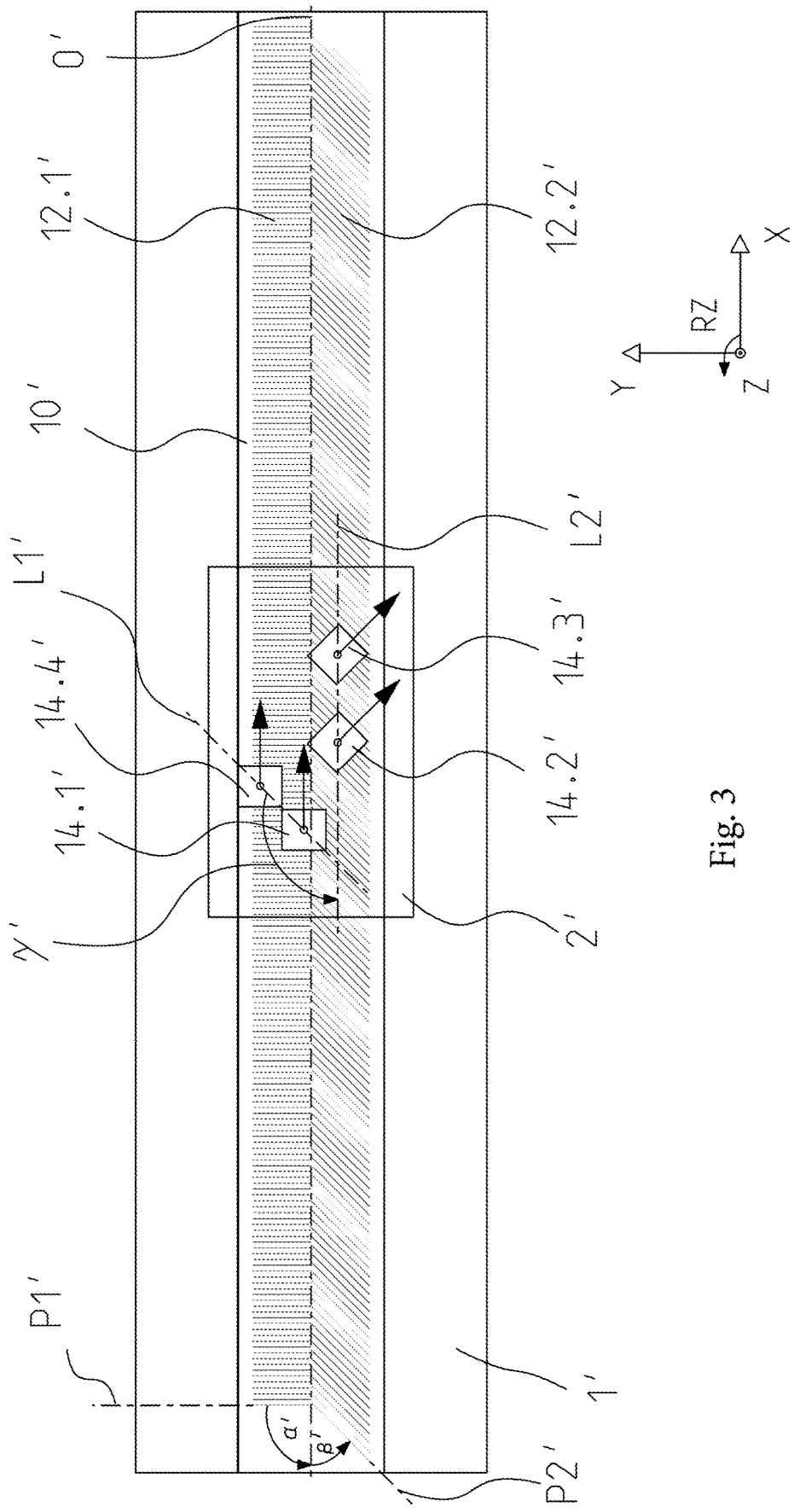
FIG. 3 shows a position-measuring device that is not configured in accordance with the invention to illustrate a counterexample.

The position-measuring device according to FIG. 3 (negative example) includes substantially the same elements as the position-measuring device according to the first through third exemplary embodiments. These elements are given the same, but primed, reference numerals. The position-measuring device according to FIG. 3 differs from the position-measuring device according to the first or second measuring exemplary embodiment in that the first straight connecting line L1' running through the scanning locations of first and fourth scanning units 14.1', 14.4' and the second straight connecting line L2' running through the scanning locations of second and third scanning units 14.2', 14.3' form the predetermined angle γ' therebetween. This predetermined angle γ' is equal to a sum of angle α' of first direction P1' and angle β' of second direction P2'. Thus, position-measuring device according to FIG. 3 does not satisfy the aforementioned condition according to equation 1.

In particular, in the position-measuring device according to FIG. 3, angle α' of first direction P1' is 90° and angle β' of second direction P2' is 45°. The predetermined angle γ' is 135°. Thus, the following holds true: γ'=α'+β'.

In all exemplary embodiments, angle α of first direction P1 and angle β of second direction P2 are each in a range of from 15° to 165°, preferably in a range of from 30° to 150°. Angle α of first direction P1 and angle β of second direction P2 are, for example, equal in magnitude (see the first and third exemplary embodiments).

Advantageously, the predetermined angle γ differs by more than ±5°, ±10° or ±15° from the sum of angle α of first direction P1 and angle β of second direction P2.

Angles α and β are defined as angles between longitudinal axis O of scale 10 and the first and second direction P1, P2, respectively (see FIGS. 1, 2 and 4). Angle γ is defined as an angle between first and second straight connecting lines L1, L2 (see FIG. 2). All angles α, β and γ are to be drawn in the positive direction of rotation (counterclockwise direction).

The scanning location is the reference point of the position measurement of the respective scanning unit 14.1 through 14.4. In FIGS. 1, 2 and 4, the scanning location is symbolized as a small circle within each of first through fourth scanning units 14.1 through 14.4.

In FIGS. 1, 2 and 4, the so-called sensitivity vector of first through fourth scanning units 14.1 through 14.4 is indicated by an arrow at the respective scanning unit 14.1 through 14.4. The sensitivity vector indicates the direction of movement in which a measurement signal derived therefrom exhibits the fastest variation per unit length traveled.

Embodiments of the invention allow for a known 1Dplus encoder to be enhanced with two inclined measuring graduations and three scanning locations to measure the in-plane degrees of freedom X, Y, RZ about a further (fourth) scanning location. The positioning of the fourth scanning location (i.e., the scanning location of fourth scanning unit 14.4) should be selected such the thermal expansion of the scanning unit carrier 2 and/or of scale 10 can be determined linearly independently of the three degrees of freedom X, Y, RZ as a further (fourth) degree of freedom. This prevents crosstalk from occurring between these four degrees of freedom. This in turn has the advantage that thermal expansion of scanning unit carrier 2 and/or of scale 10 will not affect the position determination in the degrees of freedom X, Y, RZ.

Embodiments of the invention satisfy, in particular, the requirement for a linearly independent measurement of the degrees of freedom X, Y, RZ and of the thermal expansion of scanning unit carrier 2 and/or of scale 10.

Embodiments of the invention make it possible to substantially suppress errors or deviations in the degrees of freedom X, Y, RZ, which are caused by a uniform temperature change between the individual scanning locations. Only the non-uniform component of a temperature change between the individual scanning locations could lead to residual temperature-induced errors in the position determination in the degrees of freedom X, Y, RZ. However, in many applications, such a non-uniform component of the temperature change is small.

Embodiments of the invention enable position measurement with particularly high resolution if first and second measuring graduations 12.1, 12.2 are each adapted to be optically scannable. Alternatively, first and second measuring graduations 12.1, 12.2 may also be adapted to be scannable optically, magnetically, inductively or capacitively.

Furthermore, fourth scanning unit 14.4 can be used to determine or compensate for a spatially resolved thermal expansion of scale 10.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position-measuring device, comprising:
   a scale having a first measuring graduation and a second measuring graduation, the first measuring graduation including a series of graduation structures which each extend parallel to a first direction, the second measuring graduation including a series of graduation structures which each extend parallel to a second direction, the first and second directions extending at a respective angle different from 0° with respect to a longitudinal axis of the scale;
   a first scanning unit associated with the first measuring graduation for scanning the first measuring graduation;
   a second scanning unit associated with the second measuring graduation for scanning the second measuring graduation;
   a third scanning unit associated with the second measuring graduation for scanning the second measuring graduation; and
   a fourth scanning unit associated with the first measuring graduation for scanning the first measuring graduation, and
   wherein a first straight connecting line running through centers of the first and fourth scanning units and a second straight connecting line running through centers of the second and third scanning units form a predetermined angle therebetween, the predetermined angle being not equal to a sum of the angle of the first direction and the angle of the second direction.

2. The position-measuring device as recited in claim 1, wherein the position-measuring device has a scanning unit carrier disposed so as to be movable relative to the scale, the scanning unit carrier being configured to carry each of the scanning units.

3. The position-measuring device as recited in claim 2, wherein the first and second measuring graduations and each of the scanning units are arranged and adapted such that a position of the scanning unit carrier relative to the scale can be determined in a first measurement direction and in two other degrees of freedom.

4. The position-measuring device as recited in claim 1, wherein the angle of the first direction and the angle of the second direction are each in a range of 15° to 165°.

5. The position-measuring device as recited in claim 4, wherein the angle of the first direction and the angle of the second direction are each in a range of 30° to 150°.

6. The position-measuring device as recited in claim 1, wherein the angle of the first direction and the angle of the second direction are equal in magnitude.

7. The position-measuring device as recited in claim 6, wherein the angle of the first direction and the angle of the second direction are each 45°.

8. The position-measuring device as recited in claim 1, wherein the angle of the first direction is 90° and the angle of the second direction is 45°.

9. The position-measuring device as recited in claim 1, wherein the first straight connecting line or the second straight connecting line is parallel to the longitudinal axis of the scale.

10. The position-measuring device as recited in claim 1, wherein the predetermined angle differs by more than ±5°, ±10° or ±15° from the sum of the angle of the first direction and the angle of the second direction.

11. The position-measuring device as recited in claim 1, wherein a perpendicular distance of the center of the fourth scanning unit from the second straight connecting line is greater than 2 mm, 1 mm, or 0.1 mm.

12. The position-measuring device as recited in claim 1, wherein the graduation structures of the first measuring graduation and the graduation structures of the second measuring graduation are respectively arranged periodically along a first measurement direction.

13. The position-measuring device as recited in claim 1, wherein the first and second measuring graduations are each absolute graduations.

14. The position-measuring device as recited in claim 1, wherein the first and second measuring graduations are each optically scannable.

15. The position-measuring device as recited in claim 1, wherein the predetermined angle is not equal to zero.

16. The position-measuring device as recited in claim 15, wherein the predetermined angle is 15°.

17. The position-measuring device as recited in claim 1, wherein the scanning units each include a scanning location that is a reference point for a position measurement and is located at the center of the respective scanning unit.

* * * * *